US011025537B2

(12) United States Patent
Soliman et al.

(10) Patent No.: US 11,025,537 B2
(45) Date of Patent: Jun. 1, 2021

(54) MULTIPLE RSTP DOMAIN SEPARATION

(71) Applicant: IS5 COMMUNICATIONS INC., Mississauga (CA)

(72) Inventors: Tamer Soliman, Toronto (CA); Yuri Luskind, Thornhill (CA); Kostya Belezko, Vaughn (CA); Boris Tseitin, Maple (CA)

(73) Assignee: iS5 Communications, Inc., Mississauga (CA)

( * ) Notice: Subject to any disclaimer, the term of this patent is extended or adjusted under 35 U.S.C. 154(b) by 108 days.

(21) Appl. No.: 15/830,520

(22) Filed: Dec. 4, 2017

(65) Prior Publication Data

US 2019/0173782 A1 Jun. 6, 2019

(51) Int. Cl.
*H04L 12/46* (2006.01)
*H04L 12/753* (2013.01)

(52) U.S. Cl.
CPC .......... *H04L 45/48* (2013.01); *H04L 12/4625* (2013.01); *H04L 12/4645* (2013.01)

(58) Field of Classification Search
CPC .. H04L 12/4625; H04L 12/4645; H04L 45/48
See application file for complete search history.

(56) References Cited

U.S. PATENT DOCUMENTS

| 7,292,581 | B2* | 11/2007 | Finn ..................... H04L 12/462 370/256 |
| 7,580,372 | B2* | 8/2009 | Touve .................. H04L 45/245 370/256 |
| 7,672,314 | B2 | 3/2010 | Elangovan |
| 7,894,342 | B2* | 2/2011 | Finn ..................... H04L 12/4625 370/230.1 |
| 7,920,567 | B2* | 4/2011 | Seto .................... H04L 12/4641 370/392 |
| 8,054,840 | B2* | 11/2011 | Booth .................... H04L 45/00 370/395.53 |
| 8,130,675 | B2* | 3/2012 | Raghavendran ........ H04L 41/12 370/254 |
| 8,274,919 | B2* | 9/2012 | Florit ................... H04L 12/462 370/256 |
| 8,355,348 | B1* | 1/2013 | Miller .................. H04L 12/462 370/256 |
| 8,582,467 | B2* | 11/2013 | Hirota ................. H04L 12/4625 370/254 |
| 8,797,847 | B2* | 8/2014 | Nishikawa ............. H04L 12/42 370/226 |

(Continued)

OTHER PUBLICATIONS

International Search Report dated Feb. 21, 2019 in connection with corresponding PCT application No. PCT/CA2018/051549.

*Primary Examiner* — Parth Patel
*Assistant Examiner* — Berhanu D Belete
(74) *Attorney, Agent, or Firm* — Mark D. Penner (57) ABSTRACT

The present invention relates to electronic systems for use in high demand or mission critical environments, including power stations, sub-stations, roadside transportation, rail, and industrial applications. The present invention provides a) increased resilience of mission critical communications infrastructure b) ability to maintain multiple independent RSTP domains over HSR ring d) method of using a hidden VLAN as an RSTP domain ID c) a method of creating multiple redundant protocols domains over HSR ring.

34 Claims, 3 Drawing Sheets

(56) References Cited

U.S. PATENT DOCUMENTS

| | | | | |
|---|---|---|---|---|
| 9,055,000 B1* | 6/2015 | Ghosh | | H04L 45/74 |
| 9,276,767 B2* | 3/2016 | Bos | | H04L 12/437 |
| 9,385,885 B2* | 7/2016 | Kulkarni | | H04L 12/462 |
| 9,413,609 B2* | 8/2016 | Kiessling | | H04L 45/28 |
| 9,736,065 B2* | 8/2017 | Tsai | | H04L 45/04 |
| 10,044,580 B2* | 8/2018 | Kiessling | | H04L 67/12 |
| 10,212,074 B2* | 2/2019 | Tsai | | H04L 45/04 |
| 2003/0165119 A1* | 9/2003 | Hsu | | H04L 45/00 |
| | | | | 370/258 |
| 2004/0081171 A1* | 4/2004 | Finn | | H04L 12/462 |
| | | | | 370/395.53 |
| 2005/0207348 A1* | 9/2005 | Tsurumi | | H04L 12/437 |
| | | | | 370/241 |
| 2006/0007939 A1* | 1/2006 | Elangovan | | H04L 12/465 |
| | | | | 370/395.53 |
| 2006/0146845 A1* | 7/2006 | Rose | | H04L 12/462 |
| | | | | 370/402 |
| 2007/0171814 A1* | 7/2007 | Florit | | H04L 45/02 |
| | | | | 370/216 |
| 2011/0002337 A1* | 1/2011 | Akahane | | H04L 45/22 |
| | | | | 370/395.53 |
| 2011/0019679 A1* | 1/2011 | Akahane | | H04L 12/4641 |
| | | | | 370/401 |
| 2011/0116508 A1* | 5/2011 | Kirrmann | | H04L 12/437 |
| | | | | 370/392 |
| 2011/0149738 A1* | 6/2011 | Rose | | H04L 45/48 |
| | | | | 370/235 |
| 2012/0008530 A1* | 1/2012 | Kulkarni | | H04L 12/42 |
| | | | | 370/256 |
| 2012/0155245 A1* | 6/2012 | Zhang | | H04L 45/28 |
| | | | | 370/216 |
| 2012/0163521 A1* | 6/2012 | Kirrmann | | H04J 3/067 |
| | | | | 375/356 |
| 2012/0257539 A1* | 10/2012 | Kugel | | H04L 47/00 |
| | | | | 370/254 |
| 2012/0314579 A1* | 12/2012 | Matsuike | | H04L 41/0896 |
| | | | | 370/236 |
| 2013/0051215 A1* | 2/2013 | Kim | | H04L 69/40 |
| | | | | 370/216 |
| 2013/0211611 A1* | 8/2013 | Ahrensbach | | F03D 7/048 |
| | | | | 700/287 |
| 2013/0250815 A1* | 9/2013 | Singh | | H04L 45/18 |
| | | | | 370/256 |
| 2013/0279525 A1* | 10/2013 | Zheng | | H04J 3/0667 |
| | | | | 370/516 |
| 2014/0016639 A1* | 1/2014 | Ding | | H04L 12/1886 |
| | | | | 370/390 |
| 2014/0185427 A1* | 7/2014 | Ditzel, III | | H04L 12/437 |
| | | | | 370/223 |
| 2014/0254347 A1* | 9/2014 | Xie | | H04L 12/437 |
| | | | | 370/218 |
| 2016/0269167 A1* | 9/2016 | Kirrmann | | G04G 7/00 |
| 2016/0373272 A1* | 12/2016 | Xu | | H04L 41/0659 |
| 2017/0155525 A1* | 6/2017 | Nakai | | H04L 43/0811 |
| 2017/0366397 A1* | 12/2017 | Gerspach | | H04L 41/0806 |
| 2018/0076974 A1* | 3/2018 | Colven | | H04L 41/0813 |

* cited by examiner

FIG. 3

MULTIPLE RSTP DOMAIN SEPARATION

FIELD OF INVENTION

The present invention relates to multiple rapid spanning tree protocol ("RSTP") domain separation for network use in high demand or mission critical environments, including, but not limited to, power stations, sub-stations, intelligent transportation systems (ITS), rail, traffic control systems, chemical, oil & gas, critical manufacturing, and industrial applications.

BACKGROUND TO THE INVENTION

Communication between computers has become an important aspect of everyday life in both private and business environments. Networks provide a medium for this communication and further for communication between various types of elements connected to the network such as servers, personal computers, workstations, memory storage systems, or any other component capable of receiving or transmitting data to or from the network. The elements communicate with each other using defined protocols that define the orderly transmission and receipt of information. In general, the elements view the network as a cloud to which they are attached and for the most part do not need to know the details of the network architecture such as how the network operates or how it is implemented. Ideally, any network architecture should support a wide range of applications and allow a wide range of underlying technologies. The network architecture should also work well for very large networks, be efficient for small networks, and adapt to changing network conditions.

Networks can be generally differentiated based on their size. At the lower end, a local area network (LAN) describes a network having characteristics including multiple systems attached to a shared medium, high total bandwidth, low delay, low error rates, broadcast capability, limited geography, and a limited number of stations, and are generally not subject to post, telegraph, and telephone regulation. At the upper end, an enterprise network describes connections of wide area networks and LANs connecting diverse business units within a geographically diverse business organization.

To facilitate communication within larger networks, the networks are typically partitioned into subnetworks, each sharing some common characteristic such as geographical location or functional purpose, for example. The partitioning serves two main purposes: to break the whole network down into manageable parts and to logically (or physically) group users of the network. Network addressing schemes may take such partitioning into account and thus an address may contain information about how the network is partitioned and where the address fits into the network hierarchy.

One of the commonly known issues with L2 networks is the possibility of developing switch loops. Switch loops can result in circulating the same frame a very large number of times causing a network or broadcast storms that can have severe impact in network operation or can render a network unusable. A number of L2 network loop avoidance protocols standards are known, such as, for example, STP, RSTP and other similar protocols. However, these existing protocols may be insufficient in operation of mission critical infrastructure.

SUMMARY OF THE INVENTION

There remains a need for RSTP domain separation within the same L2 network. Domain separation separates data into (and optionally to separate administration by) logically-defined domains. Separate RSTP domains on the same L2 network may be required for large L2 networks and also medium size L2 networks for critical infrastructure applications. The benefits of RSTP domain separation may include, but are not limited to, scaling, stability, fault impact isolation and better network re-convergence time in case of topology changes.

Aspects of the present invention are directed to (a) increased resilience of mission critical communications infrastructure; (b) better network scalability; (c) improved convergence time; (d) ability to maintain multiple independent RSTP domains over an HSR ring topology; (e) fault isolation (e.g. a fault in one RSTP domain can have zero topology change or impact on another RSTP domain (or instances thereof) in the same L2 network); (f) using a hidden VLAN as an RSTP domain ID; and (g) creating multiple redundant protocol control domains over HSR ring topology.

Accordingly, it is a goal of this invention to at least partially overcome some of the disadvantages of the prior art. Also, it is a goal of the embodiments of this invention to provide an improved type of network topology for mission critical environments.

An aspect of the present invention comprises a system for domain separation in a control plane of an L2 network having a plurality of network instances, the system comprising: (a) a first ring network 101; (b) a second network 103 having the plurality of network instances, each instance of the second network 103 connected to the first ring network 101 through a plurality of network devices 102 and generating at least one second network control frame 200 and each network device keeping the control plane of the first ring network 101 and the second network 102 separate while integrating the data plane of the first and second networks; (c) each network device 102 receiving the at least one second network control frame 200 from each instance associated with the network device and assigning each of the at least one second network control frame 200 a second network domain ID and a control frame domain ID thereto by each network device 102, and releasing the second network control frame 200 with the control frame domain ID as a marked second network control frame 201 to be carried on the first ring network 101; and wherein, when each network device 102 receives the marked second network control frame 201 from the first ring network 101 and where the control frame domain ID of the marked second network control frame 201 matches the control frame domain ID of the specific instance of the second network 103, the network device 102 releases the second network control frame 200 to the instance of the second network 103 associated with that control frame domain ID after removing the control frame domain ID from the marked second network control frame 201.

Another aspect of the invention further comprises the system noted above wherein the plurality of network instances are distributed over one or more control domains of the second network 103.

Yet another aspect of the invention further comprises the system noted above wherein at least two instances of the plurality of the network instances of the second network 103 belong to the same control domain.

Yet another aspect of the invention further comprises the system noted above wherein the second network domain ID further comprises a frame tag.

Yet another aspect of the invention further comprises the system noted above wherein the frame tag is attached, embedded or associated with the second network domain ID.

Yet another aspect of the invention further comprises the system noted above wherein the frame tag is in a virtual container.

Yet another aspect of the invention further comprises the system noted above wherein the second network control frame is a BPDU.

Yet another aspect of the invention further comprises the system noted above wherein the first ring network is configured as an HSR ring.

Yet another aspect of the invention further comprises the system noted above wherein the second network is configured as an STP/RSTP domain.

Yet another aspect of the invention further comprises the system noted above wherein the network device is a HSR-DS device.

Yet another aspect of the invention further comprises the system noted above wherein the virtual container is comprised of a hidden VLAN for control traffic, without impacting network traffic.

Another aspect of the invention comprises a method for domain separation in a control plane of a L2 network having a plurality of network instances, the method comprising: (a) connecting a first ring network 101 to a second network 103 having the plurality of network instances, each instance of the second network 103 connected to the first ring network 101 through a plurality of network devices 102; (b) generating at least one second network control frame 200 and each network device keeping the control plane of the first ring network 101 and the second network 102 separate while integrating the data plane of the first and second networks; (c) receiving the at least one second network control frame 200 from each instance associated with the network device from each network device 102 assigning each of the at least one second network control frame 200 a second network domain ID and a control frame domain ID upon releasing the second network control frame 200 with the control frame domain ID as a marked second network control frame 201 to be carried on the first ring network 101; and wherein, when each network device 102 receives the marked second network control frame 201 from the first ring network 101 and where the control frame domain ID of the marked second network control frame 201 matches the control frame domain ID of the specific instance of the second network 103, the network device 102 releases the second network control frame 200 to the specific instance of the second network 103 after removing the control frame domain ID from the marked second network control frame 201.

Another aspect of the invention further comprises the method noted above wherein the plurality of network instances are distributed over one or more control domains of the second network 103.

Yet another aspect of the invention further comprises the method noted above wherein at least two instances of the plurality of the network instances of the second network 103 belong to the same control domain.

Yet another aspect of the invention further comprises the method noted above wherein the second network domain ID further comprises a frame tag.

Yet another aspect of the invention further comprises the method noted above wherein the frame tag is attached, embedded or associated with the second network domain ID.

Yet another aspect of the invention further comprises the method noted above wherein the frame tag is in a virtual container.

Yet another aspect of the invention further comprises the method noted above wherein the second network control frame is a BPDU.

Yet another aspect of the invention further comprises the method noted above wherein the first ring network is configured as an HSR ring.

Yet another aspect of the invention further comprises the method noted above wherein the second network is configured as an STP/RSTP domain.

Yet another aspect of the invention further comprises the method noted above wherein each network device is configured as an HSR-DS device.

Yet another aspect of the invention further comprises the method noted above wherein the virtual container is comprised of a hidden VLAN for control traffic, without impacting network traffic.

Another aspect of the invention comprises a network device for domain separation in a control plane of an L2 network having a plurality of network instances, the device connecting a first network 101 to a second network 103, the second network having the plurality of network instances and comprising: (a) a first port 150 for receiving at least one second network control frame 200 from each instance associated with the network device and having an Domain Separation logic function for assigning a control frame domain ID to each of the at least one second network control frame 200 prior to releasing through port 120 to port 110; (b) a second port 110 for receiving a second network control frame with a control frame domain ID attached thereto 201; (c) a third port 120 for receiving: (i) from the second port 110, the at least one marked second network control frame having a control frame domain ID 201 and comparing the control frame domain ID with the control domain ID of the specific instance of the second network 103 to determine whether the control frame domain ID of the specific instance of the second network 103 matches the control frame ID of the at least one marked second network control frame and where the marked second network control frame 201 match, releasing the second network control frame without the control frame domain ID as an unmarked second network control frame 200 to be carried on the second network 103; and (ii) from port 150, at least one second network control frame 200 from each instance associated with the network device and assigning a control frame domain ID to each of the at least one second network control frame 200 prior to releasing through port 120 to port 110 as per the Domain Separation Logic Function; and (d) a forth port 160 acting as a virtual switch port.

Another aspect of the invention further comprises the device noted above wherein the first network 101 is a HSR ring and port 120 is an interlink port.

Yet another aspect of the invention further comprises the device noted above wherein the second network is a STP/RSTP domain.

Yet another aspect of the invention further comprises the device noted above wherein at least two of the plurality of network instances of the second network 103 belong to the same control domain.

Yet another aspect of the invention further comprises the device noted above wherein the second network domain ID further comprises a frame tag.

Yet another aspect of the invention further comprises the device noted above wherein the frame tag is attached, embedded or associated with the second network domain ID.

Yet another aspect of the invention further comprises the device noted above wherein the frame tag is in a virtual container.

Yet another aspect of the invention further comprises the device noted above wherein the second network control frame is a BPDU.

Yet another aspect of the invention further comprises the device noted above wherein the tag is embedded in the BPDU frame.

Yet another aspect of the invention further comprises the device noted above wherein the BPDU tag is placed in the BPDU in a virtual container.

Yet another aspect of the invention further comprises the device noted above wherein the virtual container is comprised of a hidden VLAN used on the HSR-DS devices for the purpose of domain separation without impacting network traffic.

BRIEF DESCRIPTION OF THE DRAWINGS

In the drawings, which illustrate embodiments of the invention.

DESCRIPTION OF THE PREFERRED EMBODIMENTS

The description that follows, and the embodiments described therein, is provided by way of illustration of an example, or examples, of particular embodiments of the principles and aspects of the present invention. These examples are provided for the purposes of explanation, and not of limitation, of those principles and of the invention.

It should also be appreciated that the present invention can be implemented in numerous ways, including as a process, method, an apparatus, a system, a device or a method. In this specification, these implementations, or any other form that the invention may take, may be referred to as processes. In general, the order of the steps of the disclosed processes may be altered within the scope of the invention. The description that follows, and the embodiments described therein, is provided by way of illustration of an example, or examples, of particular embodiments of the principles and aspects of the present invention. These examples are provided for the purposes of explanation, and not of limitation, of those principles and of the invention.

It will be understood by a person skilled in the relevant art that in different geographical regions and jurisdictions these terms and definitions used herein may be given different names, but relate to the same respective systems.

A person skilled in the relevant art will understand that networks can be described as having multiple layers with network ready devices (e.g. computers) connected thereto, communicating with each other using "peer-to-peer" protocols. The Open Systems Interconnection ("OSI") Reference Model provides a generalized way to view a network using multiple layers and is a convenient reference for mapping the functionality of other models and actual implementations. The distinctions between the layers in any given model is clear, but the implementation of any given model or mapping of layers between different models is not. For example, the standard promulgated by the Institute of Electrical and Electronics Engineers (IEEE) in its 802 protocols defines standards for LANs and its definitions overlap the bottom two layers of the OSI model.

In any such model, a given layer communicates either with the same layer of a peer end station across the network, or with the same layer of a network element within the network itself. A layer implements a set of functions that are usually logically related and enable the operation of the layer above it. Layer 1 ("L1"), the physical layer, provides functions to send and receive unstructured bit patterns over a physical link. The physical layer concerns itself with such issues as the size and shape of connectors, conversion of bits to electrical signals, and bit-level synchronization. More than one type of physical layer may exist within a network. Common types of Layer 1 are found within IEEE Standard 802.3 and FDDI (Fiber Distributed Data Interface). Layer 2 ("L2"), the data link layer, provides support for framing, error detecting, accessing the transport media, and addressing between end stations interconnected at or below layer 2. The data link layer is typically designed to carry packets of information across a single hop, i.e., from one end station to another within the same subnet, or LAN. Layer 3, the network layer, provides support for various higher functions as, for example, end to end addressing, network topological information, routing, packet fragmentation, etc. . . . L3 may be configured to send packets along the best "route" from its source to its final destination. An additional feature of this layer is the capability to relay information about network congestion to the source or destination if conditions warrant. Networks frequently employ a combination of ISO Layer 2 and Layer 3 because of the success of the Internet and the increasing number of products and networks using the Internet. Specifically, in a typical Internet-associated network, designers combine an implementation in accordance with the IEEE 802 Standard (which overlaps ISO Layer 1 and Layer 2) with the Internet Protocol (IP) network layer. A person skilled in the art will understand that the terms "L2" and "L3" refer to Layer 2 and Layer 3, respectively, and refer to communications components of a network. The 'layers' refer to how one configures a network. Layer 2 is the data link where data packets are encoded and decoded into bits. The MAC (Media Access Control) sub layer controls how a computer on the network gains access to the data and permission to transmit it and the LLC (Logical Link control) layer controls frame synchronization, flow control and error checking. Layer 3 provides switching and routing technologies, creating logical paths, known as virtual circuits, for transmitting data from node to node. Routing and forwarding are functions of this layer, as well as addressing, internetworking, error handling, congestion control and packet sequencing. A layer 2 Data Link is responsible for physical addressing, error correction, and preparing the information for the media A layer 3 Network is responsible for logical addressing and routing IP, ICMP, ARP, RIP, IGRP, and routers.

A person skilled in the relevant art will understand the rapid spanning tree protocol ("RSTP") standard (IEEE 802.1W) is an improvement over spanning tree protocol ("STP") standard (IEEE 802.1D). RSTP provides significantly faster spanning tree convergence after a topology change, introducing new convergence behaviors and bridge port roles to do this. While STP can take 30 to 50 seconds to respond to a topology change, RSTP is typically able to respond to changes within 3×Hello times (default: 3 times 2 seconds) or within a few milliseconds of a physical link failure. The Hello time is an important and configurable time interval that is used by RSTP for several purposes; its default value is 2 seconds.

A person skilled in the relevant art will understand that the "topology" of a network refers to the specific physical (e.g. real) or logical (e.g. virtual) arrangement of elements and/or devices comprising a network. For example, two networks may have the same topology if the connection configuration is the same, although the networks may differ in physical interconnections, distances between nodes, transmission rates, and/or signal types. A person skilled in the relevant art will understand that there are many kinds or types of network topologies, including, but not limited to, bus topology, fully connected topology, hybrid topology, mesh topology, star topology, tree topology, etc. A preferred embodiment of the present invention utilities a "ring" topology, where every node has exactly two branches connected to it.

Elements of the present invention may be implemented with computer systems which are well known in the art. Generally speaking, computers include a central processor, system memory, and a system bus that couples various system components (typically provided on cards, including the system memory, to the central processor. A system bus may be any of several types of bus structures including a memory bus or memory controller, a peripheral bus, and a local bus using any of a variety of bus architectures. The structure of a system memory may be well known to those skilled in the art and may include a basic input/output system (BIOS) stored in a read only memory (ROM) and one or more program modules such as operating systems, application programs and program data stored in random access memory (RAM). Computers may also include a variety of interface units and drives for reading and writing data. A user or member can interact with computer with a variety of input devices, all of which are known to a person skilled in the relevant art. Computers can operate in a networked environment using logical connections to one or more remote computers or other devices, such as a server, a router, a network personal computer, a peer device or other common network node, a wireless telephone or wireless personal digital assistant. The computer of the present invention may include a network interface that couples the system bus to a local area network (LAN). Networking environments are commonplace in offices, enterprise-wide computer networks and home computer systems. A wide area network (WAN), such as the Internet, can also be accessed by the computer or mobile device. Computers can operate in a networked environment using logical connections to one or more remote computers or other devices, such as a server, a router, a network personal computer, a peer device or other common network node, a wireless telephone or wireless personal digital assistant. The computer of the present invention may include a network interface that couples the system bus to a local area network (LAN). Networking environments are commonplace in offices, enterprise-wide computer networks and home computer systems. A wide area network (WAN), such as the Internet, can also be accessed by the computer or mobile device.

Although the present specification describes components and functions implemented in the embodiments with reference to standards and protocols known to a person skilled in the art, the present disclosure as well as the embodiments of the present invention are not limited to any specific standard or protocol. Each of the standards for Internet and other forms of computer network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Preferred embodiments of the present invention can be implemented in numerous configurations depending on implementation choices based upon the principles described herein. Various specific aspects are disclosed, which are illustrative embodiments not to be construed as limiting the scope of the disclosure. Although the present specification describes components and functions implemented in the embodiments with reference to standards and protocols known to a person skilled in the art, the present disclosures as well as the embodiments of the present invention are not limited to any specific standard or protocol.

A person skilled in the art will understand "mission critical" to refer systems or components, equipment, personnel, processes, procedures, software, etc. associated therewith that are essential to operation. Failure or disruption of such mission critical systems or elements thereof will result in serious impact on operations. mission critical systems are the systems that essential to the business and operational safety. These are resilient systems with high degree of availability and performance matching stringent performance requirement. A person skilled in the art would understand that these are set out in various industrial standards, including, for example, IEC standards 61850-3 etc.

Some portion of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. may be here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

The present invention relates to electronic equipment (e.g. data transfer devices) and methods of using the same. More particularly, the present invention is directed to critical infrastructure security framework for network use in high demand or mission critical environments.

A person skilled in the relevant art will understand a web-based application refers to any program that is accessed over a network connection using HTTP, rather than existing within a device's memory. Web-based applications often run inside a web browser or web portal. Web-based applications also may be client-based, where a small part of the program is downloaded to a user's desktop, but processing is done over the Internet on an external server. Web-based applications may also be dedicated programs installed on an internet-ready device, such as a smart phone.

A person skilled in the relevant art will understand that high-availability seamless redundancy ("HSR") is a network protocol for ethernet that provides seamless failover against failure of any network component (IS IEC 62439-3). Ethernet has been established as standard technology in office communication. Ethernet is now being used for new applications in industrial controls and in substation automation. Ethernet has also found use in the automotive industry for diagnostic access and has been explored for further usage in vehicular applications. HSR therefore provides a ring-redundancy protocol related to substation automation.

Embedded Ethernet MACs and switches are utilized to provide Ethernet network connectivity to a host processor. The host processor may typically perform any number of functions such as, for example: device functions such as capturing sensor data from various sensors such as temperature sensor, accelerometer sensors, and position sensors; actuator functions such as controlling synchro motors, linear actuators, solenoids and valves; hybrid functions such as combination sensor and actuator functions; human-machine interface functions; data recorder functions; and gateway functions such as connecting multiple sensors and actuators via another communication means. Host functions may also include controller functions to control various devices and sensors; supervisory functions used for setup and maintenance of other elements on the network; and standalone subsystem functions.

The use of two-port switches in industrial networking may be typical for at least two reasons. One reason may be for providing daisy chain and ring networking topologies and another reason is to provide redundancy. Daisy chain networking reduces cabling and installation costs in many cases, eliminates dedicated infrastructure switch devices, provides a familiar installation approach, and requires a reduced cabinet footprint, i.e., a reduced infrastructure switch count. A so-called "ring network" is a network topology in which each node connects to exactly two other nodes, forming a single continuous pathway for signals through each node (e.g. a "ring"). Data travels from node to node, with each node along the way handling every packet. With appropriate network management protocols in a ring topology, the two-port switches provide no loss of functionality on a single point of failure in the network.

As understood by a person skilled in the relevant art, a switch loop or bridge loop occurs in computer networks when there is more than one L2 (OSI model) path between two endpoints (e.g. multiple connections between two network switches or two ports on the same switch connected to each other). The loop creates "broadcast storms" as broadcasts and multicasts are forwarded by switches out every port, the switch or switches will repeatedly rebroadcast the broadcast messages flooding the network. Since the L2 header does not support a time to live (TTL) value, if a frame is sent into a looped topology, it can loop forever. A physical topology that contains switch or bridge loops is attractive for redundancy and reliability reasons, yet a switched network must not have loops. A solution is to allow physical loops, but create a loop-free logical topology using the shortest path bridging (SPB) protocol or the older spanning tree protocols (STP) on the network switches.

Specialized protocols that run on top of standard Ethernet also require a daisy-chain or ring topologies as a basic part of their operation. Such protocols include, but are not limited to PROFINET IRT (class C), Sercos III, EtherNet/IP DLR, HSR (the ring-redundancy protocol related to substation automation), and ETHERCAT. PRP, another redundancy protocol related to substation automation, requires two ports, but not operating as a switch.

A person skilled in the relevant art will understand that "failover" is switching to a redundant or standby computer server, system, hardware component or network upon the failure or abnormal termination of the previously active application, server, system, hardware component, or network. Failover and switchover are essentially the same operation, except that failover is automatic and usually operates without warning, while switchover requires human intervention. HSR nodes have two ports and act as a switch (e.g. a bridge), which allows to arrange them into a ring or meshed structure, without dedicated switches. HSR is suited for applications that request high availability and short switchover time, such as, for example, in mission critical environments (e.g. protection for electrical substation, synchronized drives (e.g. in printing machines) or high power inverters. For such applications, the recovery time of commonly used protocols such as the Rapid Spanning Tree Protocol (RSTP) is too long. HSR requires hardware support, to forward or discard frames within microseconds and allows a failover time of zero supported by the implementation, the path redundancy and frame duplication. HSR has the limitation of requiring a ring topology to function while in real life situations other network physical topologies may exist and need to be accommodated. Due to this fact, it may be required to combine HSR with other technologies and protocols similar to RSTP to offer some flexibility with the specific topology used. While STP/RSTP offers an advantage when it comes to flexibility, the protocols have convergence times that may be higher than zero in the event of a link failure and may also have scalability limitations governed by what is defined in the standard as the STP/RSTP diameter. An aspect of this invention, therefore, is to overcome one or more of these limitation by allowing more scalability and segmentation of the network into multiple STP/RSTP domains that operate independently and in such a way that a fault in one domain may have no impact on the others. The segmentation does not only help with fault isolation as well as scalability, it may also facilitate better re-convergence time within the affected domain should a fault occur. The improvement in the re-conversion time is due to the fact that conversion can be a function of the size of the domain and as the domain can be segmented into smaller domains or sub-domains, there may be achieved better convergence while maintaining L2 connectivity at all times.

Network control domains are self-contained control domains within the same L2 network. A network control domain can contain one or more network instances within the same L2 network where the network instances may be topologically separated.

Connection redundancy protocols may be network protocols that deactivate redundant paths in networks in order to avoid unwanted network traffic ring closures and activate the deactivated paths in the event of network failures in order to safeguard network traffic security in the network. Such connection redundancy protocols may, for example, be Spanning Tree Protocols (STP) such as the Rapid Spanning Tree Protocol (RSTP), the Media Redundancy Protocol (MRP), the Media Redundancy Real-Time Protocol (MRRT), the Ethernet Ring Protection Protocol (ERP), the Ethernet Automatic Protection Switching Protocol (EAPS), the High-Availability Seamless Redundancy Protocol (HSR) or the Parallel Redundancy Protocol (PRP). Other redundancy protocols on communication Layer 1 or 2 may also be used. HSR network protocols for ethernet provide seamless failover against failure of any network component. HSR nodes or devices have two ports and act as a switch or bridge, which allows to arrange them into a ring or meshed structure, without dedicated switches. HSR network protocols are typically used in a ring topology or in another mesh topology. A ring network is a network topology in which each device connects to exactly two other devices, forming a single continuous pathway for signals through each device. Data travels from device/node to device/node, with each device/node handling every packet.

The operation of the network ready device (e.g. mobile device, work station, etc.) may be controlled by a variety of different program modules. Examples of program modules are routines, programs, objects, components, data structures, etc. that perform particular tasks or implement particular abstract data types. It will be understood that the present invention may also be practiced with other computer system configurations, including multiprocessor systems, microprocessor-based or programmable consumer electronics, network PCS, minicomputers, mainframe computers, and the like. Furthermore, the invention may also be practiced in distributed computing environments where tasks are performed by remote processing devices that are linked through a communications network. In a distributed computing environment, program modules may be located in both local and remote memory storage devices. One skilled in the relevant art would appreciate that the device connections mentioned herein are for illustration purposes only and that any number of possible configurations and selection of peripheral devices could be coupled to the computer system.

Embodiments of the present invention can be implemented by a software program for processing data through a computer system. It will be understood by a person skilled in the relevant art that the computer system can be a personal computer, mobile device, notebook computer, server computer, mainframe, networked computer (e.g., router), workstation, and the like. The program or its corresponding hardware implementation is operable for providing user authentication. In one embodiment, the computer system includes a processor coupled to a bus and memory storage coupled to the bus. The memory storage can be volatile or non-volatile (i.e. transitory or non-transitory) and can include removable storage media. The computer can also include a display, provision for data input and output, etc. as will be understood by a person skilled in the relevant art.

Some portion of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

It will be understood that in establishing a user interface, a task bar may be preferably positioned at the top of a screen to provide a user interface. Preferably, a textual representation of a task's name is presented in this user interface, preferably as a button, and the task names may be shortened as necessary if display space of the button is constrained. The labelled button having the task's name preferably operate as a type of hyperlink, whereby the user/viewer can immediately switch to the activity, view, etc. of an each of the tasks by selecting the button containing the applicable name from the task bar. In other words, the user or viewer is redirected by the application to that the function represented by the task button by selecting the labelled hyperlink. Preferably, the task entry associated with the currently-displayed work unit view may be shown in a different graphical representation (e.g., using a different color, font, or highlighting). In preferred embodiments, there may be provided a display having a selectable "X" in the task bar entry for each task: if the user clicks on the "X", then its associated task may be ended and the view of its work unit may be removed. A user interface may be web-based, application based, or a combination.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "creating," "providing," or the like refer to the actions and processes of a computer system, or similar electronic computing device, including an embedded system, that manipulates and transfers data represented as physical (electronic) quantities within the computer system's registers and memories into other data similarly represented as physical quantities within the computer system memories or registers or other such information storage, transmission or display devices.

A person skilled in the relevant art will understand that a "bridge protocol data unit" ("BPDU") is a data message transmitted across a local area network to detect loops in network topologies. A BPDU contains information regarding ports, switches, port priority and addresses as well as contain the information necessary to configure and maintain spanning tree topology.

A person skilled in the relevant art will understand that a virtual LAN ("VLAN") is any broadcast domain that is partitioned and isolated in a computer network at the data link layer (e.g. L2). To subdivide a network into virtual LANs, one may configure network equipment.

A person skilled in the relevant art will understand the term "domain separation" to refer to logical separation of domain(s) in the control plane related to convergence protocols, including but not limited to, STP, RSTP or similar protocols. The data (e.g. L2) connectivity is maintained across the domains in the control plane as long as the networks belong to the same L2 data domain. The STP/RSTP domain separation requires that the multiple domains operate independently from a loop prevention perspective without the need or the ability to receive other STP/RSTP domains BPDU, although existing on the same L2 data domain. In mission critical systems, availability and reliability are key issues for time-critical applications because a failing communication system can lead to an interruption of the application, a shutdown of an industrial plant, or a crash of a vehicle controlled by the latter. Therefore, communication network redundancy is an important feature of mission critical communication systems demanding high availability, in particular those systems using Ethernet-based communication with commercial switches. A key factor of a redundant system is the recovery delay in case of failure, i.e. the time it takes until a redundant component takes over the role of a failed component. Time-critical processes have specified recovery delays on the order of milliseconds or, preferably, even a seamless recovery invisible to the user. If a delay is too long the interruption in service can trigger unwanted consequences.

In a ring network, switching nodes have two communication ports connecting to two neighbor nodes and being able to forward frames from one port to the other according to bridging rules. A switching element can also be integrated within the node where the source or destination application runs, thus forming a switching end node. With full-duplex links, the ring network can be operated in either or both directions. As a result, the ring network offers resiliency against link failure. Ring protocols are known from a Fiber Distributed Data Interface (FDDI) or Token Ring, or HSR are used to maintain reliability in a ring topology while protocols such as RSTP (IEEE 802.1D) ensure that frames cannot circulate indefinitely in a ring topology or any other topology with redundant links. A ring topology provides cost-effective redundancy, since only one additional link is needed to protect against any single link failure. In some circumstances other topologies can be more effective and practical as other due the can offer flexibility in the topology.

Figure 1:
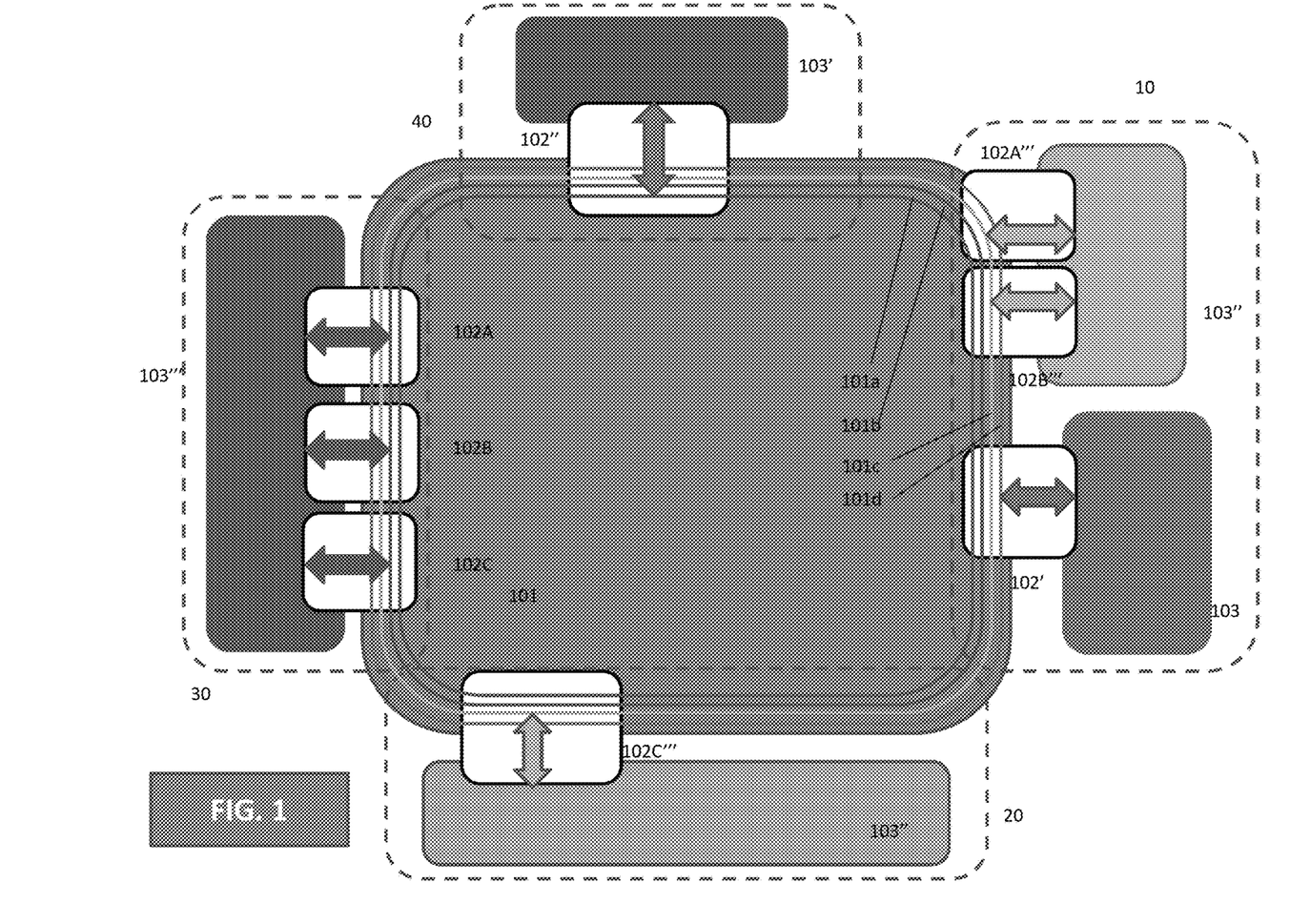
FIG. 1 illustrates a preferred embodiment of the present invention.

FIG. 1 illustrates a preferred embodiment of the present invention. A representative L2 network topology is shown having a first network 101 and a second network with one or more RSTP control domains and at least one domain having one or more instances thereof, each domain (and applicable instances) having applicable domain IDs, which in FIG. 1 are shown as 103, 103', 103" and 103'''. It will be understood that any L2 network configuration would be encompassed by the present invention, provided that there is at least one main network, preferably having a ring topology, and at least one second network, preferably having multiple domains and more preferably at least one domain having at least one or more instances. In a further preferred embodiment, the second network may be a STP/RSTP network with one or more domains; the domains may also have one or more instances. It will be further understood that the STP/RSTP domains can be provided in as well as across multiple sites (e.g. locations). A person skilled in the art will understand that sites 10, 20, 30 and 40 of FIG. 1 are only used as examples; in a typical critical infrastructure network there may be one or more control rooms, one or more critical infrastructure sites, etc. which are collectively referred to as "sites". It will be further understood that one or more domains (and/or instances therein) can be provided across sites. As shown in FIG. 1 domain (and instance) 103" is provided across (e.g. within both) sites 10 and 20. In a preferred embodiment, these domains are RSTP domains, but it will be understood that these domains could also be STP domains. It will be understood that when used herein, "RSTP domain" or "STP/RSTP Domain" may be used broadly to refer to any STP/RSTP network topology. While not shown in FIG. 1, it will be understood that a number of network devices will be connected to the second network domains (e.g. 103") through the first network. Such network devices may include, but are not limited to, network controllers, such as a programmable logic controller (PLC) or distributed input/output (DIO) controller, interacting with a number of other devices such as input/output (I/O) devices.

In a preferred embodiment, one or more domain separation devices (see for example, FIG. 1, which provides devices 102, 102', 102" and 102''') may be coupled to and configured to operate between the first network (preferably an HSR ring) 101 and various STP/RSTP domains (103, 103', 103", and 103'''). Each domain separation device supports the first network and the second network from the one or more STP/RSTP subrings or domains (103, 103', 103", and 103''') and operates by keeping the control plane of the first network and the one or more STP/RSTP subrings or domains separate while integrating the data plane (e.g. domain separation). In a preferred embodiment, domain separation devices 102, 102', 102", and 102''' also have the capability to facilitate the STP/RSTP domain separation (e.g. the "HSR function"). A device which facilitates the HSR function and provides the domain separation function is referred to herein as an "HSR-DS device". It will be understood that the control plane of the ring structures may be separated by keeping the network control protocols of each network separate. Separate control planes also provide the ability to have separate domains or "fault domains", preventing any fault from one region or domain propagating into the other region or domain.

An embodiment of the present invention is directed to an HSR-DS device which can be any network device configured for domain separation in the control plane of a L2 network which connects a first and second network where the second network has a plurality of network instances (which may be in one of more control domains). In a more preferred embodiment, the HSR-DS device is capable of performing a "domain separation" logic function (see function 130 in FIGS. 2 and 3). In a further preferred embodiment, the HSR-DS device may have one or more switch side ports (see, for example, port 150 in FIG. 3) that is configured for receiving at least one network control frame (e.g. BPDU 200 in FIG. 2) generated within one or more network domain instances associated with (e.g. connected to) that network device. This domain separation logic function (e.g. a processing function) may assign a control frame domain ID to each network control frame it receives from the switch side port 150 through interlink port 120 prior to releasing through to one or more device side ports (see, for example, port 110 in FIG. 3) where it will be "released" to HSR ring 101. In other words, the HSR-DS device may receive from the switch side port (e.g. port 150 in FIG. 3), a network control frame generated within the RSTP domain network (see, for example, BPDU 200 in FIG. 2) and assign the control frame domain ID of that HSR-DS device thereto prior to releasing the "marked" network control frame through interlink port 120 to port 110.

Figure 2:
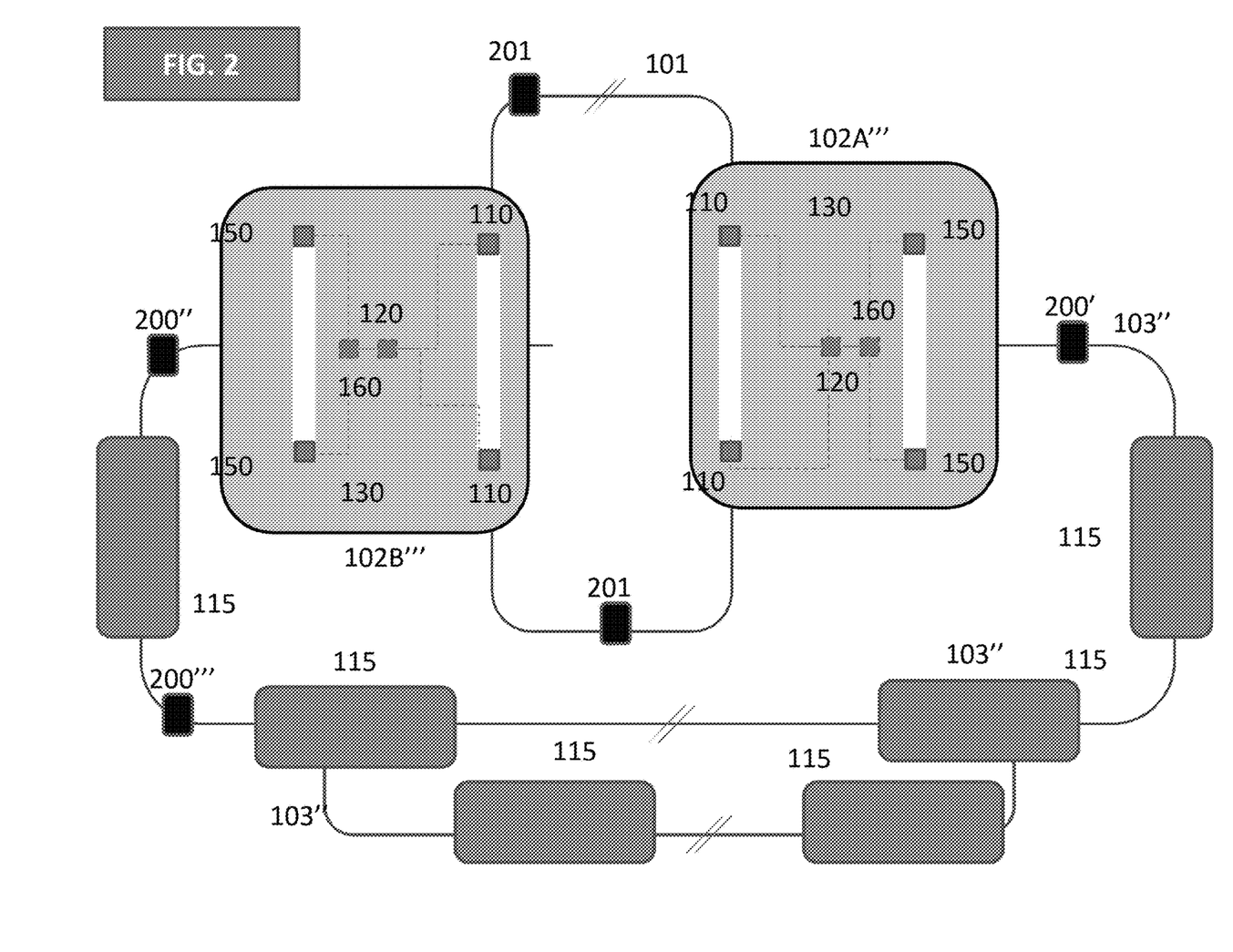
FIG. 2 illustrates a preferred embodiment of the present invention.

In a further preferred embodiment, the HSR-DS device may comprise one or more second "device side" ports (see, for example, port 110 in FIG. 3) that is configured for receiving at least one network control frame from the HSR ring that has been tagged or marked with a control frame domain ID (see marked BPDU 201 in FIG. 2). In a further preferred embodiment, the HSR-DS device may comprise a further port, which in a further preferred embodiment is an internal interlink port (e.g. internal to the device and not visible when the device is fully assembled or a virtual interlink port (for example, see 120 in FIG. 2). This further port is configured for receiving from the device side port (see 110 in FIG. 3) a marked or tagged network control frame (e.g. BPDU 201 in FIG. 2; marked with a specific control frame domain ID). Upon receipt thereof, and as part of the domain separation logic function, the control frame domain ID of the marked network control frame is compared with the control domain ID of the specific instance of the second network associated with that device (as provided in interlink port 120) in order to determine whether the control frame domain ID of that specific network domain instance matches the control frame ID of the marked network control frame received from the device side port. Where the control domain of the marked network control frame and the control domain ID of the specific instance of the second network associated with that device match, the HSR-DS device releases the network control frame into the second network domain (see, for example 200' in FIG. 3) without the control frame domain ID as an unmarked network control frame 200 to be carried on the STP/RSTP domain network. All of the above noted functions may be generally referred to as the domain separation logic function. It will be further understood that any configuration of ports 150 or 110 are contemplated. In a preferred embodiment, there are two of each such ports provided in FIGS. 2 and 3. However any number of such ports would be permitted within the scope of the invention.

As can be seen from FIG. 1, there is shown a first network 101 having a ring topology and four separate regions, domains or instances of a second network (103, 103', 103" and 103'") with multiple devices (e.g. 102, 102', etc.) providing an interconnection between the first and second networks. It will be understood that while first network 101 has a ring topology, the second network may have any topology. In a preferred embodiment, network 101 has an HSR ring topology. As can be seen in FIG. 1, there can be multiple instances of each domain (see, for example, 103"). It will be understood that an embodiment of the present invention provides that, for the same L2 domain, the HSR ring can be used to facilitate creating independent and separate STP/RSTP domains via connections 101a, 101b, 101c and 101d (see FIG. 1). To do so, one or more STP/RSTP Domain IDs can be configured on each HSR-DS device, as applicable. The RSTP domain ID may be used as an identifier of each specific domain for domain separation. In a preferred embodiment, L2 connectivity can be maintained across all or some of the STP/RSTP domains.

As shown in FIG. 1 and FIG. 2, a unique second network domain ID or RSTP Domain ID may be configured on each HSR-DS device, 102, 102', 102", and 102'". In a preferred embodiment, for the same L2 domain, the HSR ring can be used to facilitate creating independent separate RSTP domains. In yet another preferred embodiment, the RSTP domain ID can be configured on each HSR-DS device (also referred to as "an HSR switch"); the RSTP domain ID is used as an identifier for each domain and facilitates the domain separation through the domain separation logic function of the HSR-DS device. Each STP/RSTP domain operates independently on the network control plane and has no network control plane protocol association with other STP/RSTP domains.

In a preferred embodiment, BPDU 201 (see FIG. 2) may be carried over the HSR ring marked by or associated with an alphanumeric or numeric "tag". In a preferred embodiment, the tag can be included in the BPDU 201' as embedded therein, amended to the BPDU frame or by placing the tag from different domains in separate virtual containers. In a preferred embodiment, the sequence number, the frame size and the path identifier may be appended in a 6-octet HSR tag or header. In a preferred embodiment, the STP/RSTP protocol traffic in the form of BPDUs 200' are contained within each domain and are not shared in-between domains. In a preferred embodiment, a virtual container can be a hidden VLAN used on the HSR-DS devices just for the purpose of domain separation without impacting network traffic.

As FIG. 2 illustrates, in a preferred embodiment BPDUs 201 are carried over the HSR ring 101 going through the HSR-DS devices 102A, 102B, 102C, 102", 102A'" 102B" and 102C"", without impacting the HSR ring traffic or topology as they are not part of the HSR control. As shown in FIG. 2, BPDUs 200', 200", and 200'" may be generated by an ethernet device (see 115 in FIGS. 2 and 3) on the STP/RSTP domain 103" and received by HSR-DS devices 102A'" and 102B'". When received from any number of ethernet ports 150 on HSR-DS device 102A" connected to the STP/RSTP domain via Ethernet switches (see 115 in FIGS. 2 and 3), it will be understood BPDU 200' is received via the switch side (referred to as the "switch side"; see FIG. 3 for example) of the HSR-DS Device. A person skilled in the relevant art would understand an ethernet switch 115 refers to a device used to build a network connection between attached devices (e.g. computers).

Figure 3:
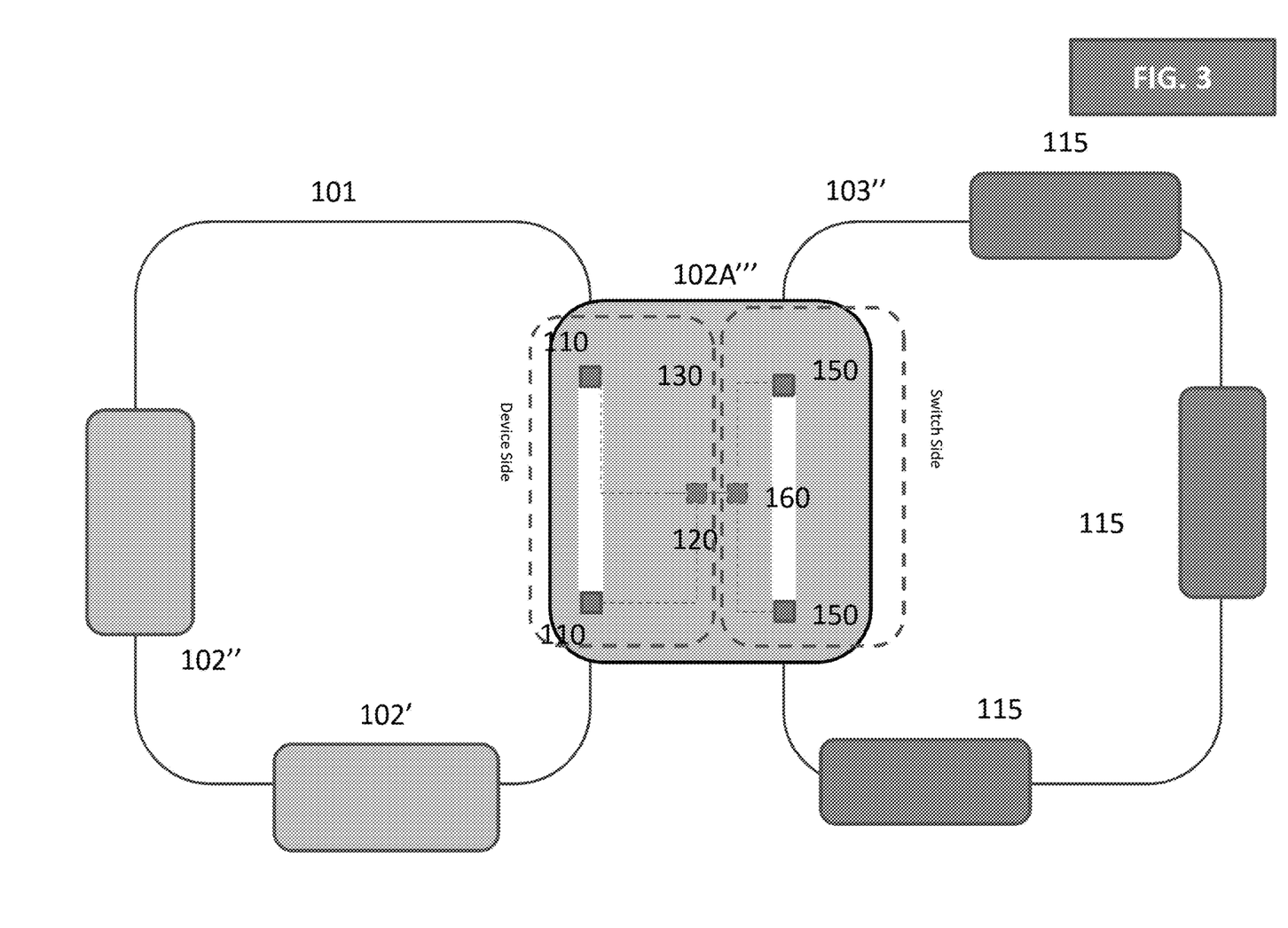
FIG. 3 illustrates a preferred embodiment of the present invention.

Once received from port 150 (the "switch side" as shown in FIG. 3), the unmarked BPDU 200' control network frames may be "tagged" with the applicable STP/RSTP Domain ID tag as configured on the virtual switch port 160 of the HSR-DS device 102A" (see FIGS. 2 and 3). Port 160 may be represented as a virtual switch port. Virtual switch port 160 may be controlled by RSTP, representing the HSR ring connection and may be introduced to facilitate L2 switch-loop prevention through blocking (for example, by the RSTP protocol) the virtual port 160 on the switch side without impacting HSR network traffic or HSR ring control traffic. It will be understood that as used herein, the term tagged or marked refers to a control network frame (e.g. a BPDU) that has been marked or tagged with a control frame ID of a specific STP/RSTP network associated network device (e.g. an HSR-DS device). Only after the unmarked BPDU 200 has been so tagged (by the DS logic function 130) will the tagged or marked BPDU 201 enter the HSR ring 101 to be carried along 101a, 101b, 101c, etc. In a preferred embodiment, marked BPDUs 201 have been assigned or "tagged" with the applicable control domain identifier by the domain separation logic function (see, for example, DS logic function represented by 130 in FIG. 2) of the HSR-DS device 102 before entering the HSR ring. As part of the DS logic function, when the marked BPDU 201 is received by the HSR-DS device from the HSR ring (the "device side" of FIG. 3) through port 110, the marked BPDU may be forward to the virtual switch port 160 of the HSR-DS device through the interlink port 120 only if the control domain ID of the marked BPDU 201 is matching the domain identifier of the STP/RSTP domain assigned to port 160 and locally configured on the HSR-DS device. In a preferred embodiment, the domain identifier may be removed by the DS logic function 130 prior to exiting the HSR ring through interlink port 120 and the virtual port 160 to switch side port 150.

FIG. 2 illustrates an embodiment of the present invention where one RSTP domain (e.g. 103") is connected over HSR ring 101 using two HSR-DS devices 102A'". A person skilled in the art would understand that FIG. 2 represents a preferred embodiment and two or more HSR-DS devices could be used, as illustrated in FIG. 1. In a preferred embodiment, this configuration can be repeated for multiple STP/RSTP domains and can take other topological shapes as long as the HSR ring is maintained in a ring topology.

As shown in FIG. 3, there is a preferred embodiment STP/RSTP domain separation implementation over HSR rings which can utilize HSR-DS devices where the HSR ring is represented to the STP/RSTP state machine as a virtual switch port 160 available through interlink port 120. The STP/RSTP state machines can block the virtual switch port 160 to prevent switch loop formation within the STP/RSTP domain 103", yet does not impact HSR ring continuity.

As noted above, STP/RSTP domain generated BPDUs 200' coming from the switch side (ports 150; see FIG. 3) get tagged with an identifier by the DS logic function 130 prior to transfer to the device side ports 110 through the virtual port 160 and the interlink port 120. In a preferred embodiment, this identifier can be a hidden VLAN ID, a tag within the BPDU frame or a tag added to the control frame all to represent the control domain ID. BPDUs received from the "device side" (see FIG. 3) are passed to the switch side port 150 via interlink port 120 and virtual switch port 160 only if found by DS logic function 130 to match the locally configured domain ID with port 160. Domain ID tags may be removed by the DS logic function 130 prior to passing the now unmarked BPDUs to the interlink port 120 and released back into an instance of the second topology 103" as "untagged" or "detagged" 200" or 200'". All BPDUs received on the device side and not matching the locally configured RSTP Domain ID are disregarded from consideration to be forwarded to the interlink port 120 and consequently not passed to the virtual switch port 160 yet they can continue to be carried over the HSR ring (see 201 in FIG. 2).

Although this disclosure has described and illustrated certain preferred embodiments. As shown in FIG. 1, in a second situation, of the invention, it may be to be understood that the invention may be not restricted to those embodiments. Rather, the invention includes all embodiments which are functional or mechanical equivalence of the specific embodiments and features that have been described and illustrated.

We claim:

1. A system for domain separation in a control plane of an L2 network for use in critical infrastructure applications, the L2 network having a plurality of network instances, the system comprising:
   (a) a first rime, network;
   (b) a second network having the plurality of network instances, each instance of the second network connected to the first ring network through a plurality of network devices and generating at least one second network control frame within the control plane across the plurality of network instances and generating at least one second network data frame within a data plane of the L2 network across the plurality of network instances and each network device keeping the control plane of the first ring network and the second network separate while integrating the data plane of the first and second networks;
   (c) each network device receiving the at least one second network control frame and the at least one second network data frame from each instance associated with the plurality of network devices and assigning each of the at least one second network control frame a second network domain ID and a control frame domain ID thereto by each network device while leaving the at least one second network data frame unmarked, and releasing the at least one second network control frame with the control frame domain ID as a marked second network control frame to be carried on the first ring network while also releasing the data frame unmarked to be carried on the first ring network;
   wherein, when each network device receives the marked second network control frame from the first ring network and where the control frame domain ID of the marked second network control frame matches the domain ID of the specific instance of the second network, the network device releases the second network control frame to the instance of the second network associated with that domain ID after removing the control frame domain ID from the marked second network control frame and when each network device receives the unmarked data frame from the first ring network, the network device releases the unmarked data frame to the plurality of network instance of the second network such that the control plane across the plurality of instances of the second network is segmented based on the second network domain ID while the data plane across the plurality of instances of the second network remains integrated across the plurality of the instances of the second network.

2. The system of claim 1 wherein the plurality of network instances are distributed over one or more control domains of the second network.

3. The system of claim 2 wherein at least two instances of the plurality of the network instances of the second network belong to the same control domain.

4. The system of claim 3 wherein the second network control frame is a bridge protocol data unit ("BPDU").

5. The system of claim 3 wherein the first ring network is configured as a high-availability seamless redundancy protocol ("HSR") ring.

6. The system of claim 3 wherein the second network is configured as a Spanning Tree Protocol Rapid Spanning Tree Protocol ("STP/RSTP") domain.

7. The system of claim 3 wherein the network device is a HSR-DS device.

8. The system of claim 2 wherein the second network domain ID further comprises a frame tag.

9. The system of claim 8 wherein the frame tag is attached, embedded or associated with the second network domain ID.

10. The system of claim 8 wherein the frame tag is in a virtual container.

11. A method for domain separation in a control plane of a L2 network for use in critical infrastructure applications, the L2 network having a plurality of network instances, the method comprising:
   (a) connecting a first ring network to a second network having the plurality of network instances, each instance of the second network connected to the first ring network through a plurality of network devices;
   (b) generating at least one second network control frame within the control plane across the plurality of network instances and generating at least one second network data frame within a data plane of the L2 network across the plurality of network instances and each network device keeping the control plane of the first ring network and the second network separate while integrating the data plane of the first and second networks;
   (c) receiving the at least one second network control frame and the at least one second network data frame from each instance associated with the network device and assigning each of the at least one second network control frame a second network domain ID and a control frame domain ID thereto by each network device while leaving the at least one second network data frame unmarked, and releasing the second network control frame with the control frame domain ID as a marked second network control frame to be carried on the first ring network while also releasing the data frame unmarked to be carried on the first ring network; and
   wherein, when each network device receives the marked second network control frame from the first ring network and where the control frame domain ID of the marked second network control frame matches the domain ID of the specific instance of the second network, the network device releases the second network control frame to the specific instance of the second network after removing the control frame domain ID from the marked second network control frame and when each network device receives the unmarked data frame from the first ring network, the network device releases the unmarked data frame to the plurality of network instance of the second network such that the control plane domain across the plurality of instances of the second network is segmented based on the second network domain ID while the data plane across the plurality of instances of the second network remains integrated across the plurality of the instances of the second network.

12. The method of claim 11 wherein the plurality of network instances are distributed over one or more control domains of the second network.

13. The method of claim 12 wherein at least two instances of the plurality of the network instances of the second network belong to the same control domain.

14. The method of claim 13 wherein the frame tag is attached, embedded or associated with the second network domain ID.

15. The method of claim 13 wherein the frame tag is in a virtual container.

16. The method of claim 13 wherein the second network control frame is a bridge protocol data unit ("BPDU").

17. The method of claim 13 wherein the first ring network is configured as a high-availability seamless redundancy protocol ("HSR") ring.

18. The method of claim 13 wherein the second network is configured as a Spanning Tree Protocol/Rapid Spanning Tree Protocol ("STP/RSTP") domain.

19. The method of claim 13 wherein each network device is configured as an HSR-DS device.

20. The method of claim 15 wherein the virtual container is comprised of a hidden VLAN for control traffic, without impacting network traffic.

21. The method of claim 12 wherein the second network domain ID further comprises a frame tag.

22. The method of claim 11 wherein the virtual container is comprised of a hidden VLAN for control traffic, without impacting network traffic.

23. A network device for domain separation in a control plane of an L2 network for use in critical infrastructure applications, the L2 network leaving a plurality of network instances, the device connecting a first ring network to a second network and the network device keeping the control plane of the first ring network and the second network separate while integrating a data plane of the first and second networks, the network device comprising:
(a) a first port for receiving at least one second network control frame and at least one second network data frame from each network instance on the second network associated with the network device, the network device having a Domain Separation Logic Function for assigning an assigned control frame domain ID to each of the at least one second network control frame prior to releasing the at least one second network control frame through a third port to a second port while leaving the at least one second network data frame unmarked prior to releasing the at least one second network data frame through the third port to the second port;
(b) the second port for receiving from the first port through the third port the at least one second network control frame with the assigned control frame domain ID assigned thereto and the at least one second network data frame unmarked and releasing the received at least one second network control frame with the assigned control frame domain ID assigned thereto to the first ring network and releasing the received at least one second network data frame unmarked to the first trot network;
(c) the third port for receiving:
(i) from the second port, (A) the at least one second network control frame with the assigned control frame domain ID assigned thereto and comparing the assigned control frame domain ID with an instance control domain ID of the one of the plurality of the network instances to determine whether the instance domain ID matches the assigned control frame domain ID and where the instance and the assigned control frames domain ID match, releasing the second network control frame with the assigned control frame domain ID assigned thereto through the first port without the assigned control frame domain ID as an unmarked second network control frame to be carried on the second network and (B) the at least one second network data frame unmarked and releasing the at least one second network data frame through to the first port unmarked such that the control plane domain across the plurality of instances of the second network is segmented based on the second network domain ID while the data plane across the plurality of instances of the second network remains integrated across the plurality of the instances of the second network; and
(ii) from the first port, the at least one second network control frame and the at least one second network data frame from each of the plurality of the network instances associated with the network device and assigning an assigned control frame domain ID to each of the at least one second network control frame prior to releasing through to second port as per the Domain Separation Logic Function while leaving the at least one second network data frame unmarked prior to releasing the at least one second network data frame through to second port.

24. The device of claim 23 wherein the first ring network is configured as a High-availability Seamless Redundancy Protocol ring and the third port is an interlink port.

25. The device of claim 24 wherein the second network is configured as a Spanning Tree Protocol/Rapid Spanning Tree Protocol domain.

26. The device of claim 25 wherein the second network domain ID further comprises a frame tag.

27. The device of claim 26 wherein the frame tag is attached, embedded or associated with the second network domain ID.

28. The device of claim 26 wherein the frame tag is in a virtual container.

29. The device of claim 26 wherein the second network control frame is a bridge protocol data unit ("BPDU").

30. The device of claim 29 wherein the fame tag is embedded in the BPDU frame.

31. The device of claim 29 wherein the frame tag is placed in the VLAN field of the Ethernet frame containing the BPDU frame as a virtual container before carrying the frame over the HSR ring.

32. The device of claim 31 wherein the virtual container is comprised of a hidden VLAN identifier placed in the VLAN field of the BPDU frame used on the HSR-DS devices for the purpose of domain separation without impacting network traffic.

33. The device of claim 25 wherein the device has a L2 ethernet switch connecting the plurality of the second network instances to the first port through a virtual ethernet switch part.

34. The device of claim 23 wherein at least two of the plurality of network instances of the second network belong to the same control domain.

* * * * *